(12) United States Patent
Chen

(10) Patent No.: US 11,068,682 B2
(45) Date of Patent: Jul. 20, 2021

(54) QR CODE GENERATION METHOD AND APPARATUS FOR TERMINAL DEVICE

(71) Applicants:BEIJING JINGDONG SHANGKE INFORMATION TECHNOLOGY, CO., LTD., Beijing (CN); BEIJING JINGDONG CENTURY TRADING CO., LTD., Beijing (CN)

(72) Inventor: Yonghua Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/044,063

(22) PCT Filed: Apr. 30, 2019

(86) PCT No.: PCT/CN2019/085146
§ 371 (c)(1),
(2) Date: Sep. 30, 2020

(87) PCT Pub. No.: WO2019/242409
PCT Pub. Date: Dec. 26, 2019

(65) Prior Publication Data
US 2021/0056275 A1    Feb. 25, 2021

(30) Foreign Application Priority Data
Jun. 22, 2018   (CN) .......................... 201810653369.0

(51) Int. Cl.
*G06K 7/14*     (2006.01)
*G06K 19/06*    (2006.01)
(Continued)

(52) U.S. Cl.
CPC ......... *G06K 7/1417* (2013.01); *G06K 7/1473* (2013.01); *G06K 19/06037* (2013.01);
(Continued)

(58) Field of Classification Search
None
See application file for complete search history.

(56) References Cited

U.S. PATENT DOCUMENTS

2009/0225183 A1\*  9/2009  Tamura ................... G06T 7/194
                                                             348/222.1

FOREIGN PATENT DOCUMENTS

CN     103886352 A   \*   6/2014
CN     103886352 A        6/2014
(Continued)

OTHER PUBLICATIONS

International Search Report and Written Opinion issued by the Chinese Patent Office acting as International Searching Authority for International Application No. PCT/CN2019/085146 dated Jul. 17, 2019 (30 pages).

*Primary Examiner* — Kristy A Haupt
(74) *Attorney, Agent, or Firm* — Dinsmore & Shohl, LLP

(57) ABSTRACT

Disclosed in embodiments of the present application are a QR code generation method and apparatus for a terminal device. The terminal device comprises a camera. A specific implementation mode of the method comprises: receiving a QR code generation instruction input by a user, wherein the QR code generation instruction comprises a QR code information; starting a camera, and generating a camera real-time photographing picture; and generating a real-time picture displaying the QR code based on the QR code information and the generated camera real-time photographing picture. The implementation mode enables the user to clearly dis- (Continued)

tinguish whether the QR code is an originally generated QR code, thereby improving the security of the QR code.

12 Claims, 6 Drawing Sheets

(51) Int. Cl.
    *G06T 5/00*     (2006.01)
    *H04N 5/232*     (2006.01)
    *G06Q 20/32*     (2012.01)

(52) U.S. Cl.
    CPC ......... *G06T 5/002* (2013.01); *H04N 5/23293* (2013.01); *G06Q 20/3276* (2013.01)

(56) References Cited

FOREIGN PATENT DOCUMENTS

| | | | |
|---|---|---|---|
| CN | 105117760 A | | 12/2015 |
| CN | 105117760 B | * | 4/2018 |

* cited by examiner

QR CODE GENERATION METHOD AND APPARATUS FOR TERMINAL DEVICE

This patent application is a national stage of International Application No. PCT/CN2019/085146, filed on Apr. 30, 2019, which claims priority to Chinese Patent Application No. 201810653369.0, filed on Jun. 22, 2018, titled "Two-Dimensional Code Generation Method and Apparatus Applied to Terminal Device," filed by Beijing Jingdong Shangke Information Technology Co., Ltd., and Beijing Jingdong Century Trade Co., Ltd. Both of the aforementioned applications are incorporated herein by reference in their entireties.

FIELD

Embodiments of the present disclosure relate to the field of computer technologies, and more particularly, to a two-dimensional code generation method and apparatus applied to a terminal device.

BACKGROUND

With the development of information processing technology, two-dimensional codes have been widely used because of their wide coding range. A two-dimensional code is generally a black-and-white color block arranged according to a certain rule on a two-dimensional plane, and the color block may be a geometric figure such as a square or a triangle. Of course, the color blocks in the two-dimensional code may alternatively be other colors of different shades, such as colors.

Currently, a two-dimensional code displayed on an electronic device is generally a static black-and-white picture or a black-and-white picture containing a static icon in the middle. Existing two-dimensional codes generally have no background image, or the background image is the same. Since the two-dimensional code is still valid after the screenshot, it is difficult for the user to recognize whether the two-dimensional code to be scanned (the two-dimensional code without the background image or the two-dimensional code with the same background image) is a two-dimensional code formed by screenshot, photographing, or the like. In certain special scenarios, such as payment or authentication, two-dimensional codes formed by screenshots or the like leave room for cheating.

SUMMARY

The embodiment of the disclosure provides a two-dimensional code generation method and apparatus applied to a terminal device.

According to a first aspect, an embodiment of the present disclosure provides a two-dimensional code generation method applied to a terminal device, the terminal device including a camera, the method including: receiving a two-dimensional code generation instruction input by a user, wherein the two-dimensional code generation instruction comprises two-dimensional code information; starting the camera to generate a camera real-time capturing picture; and generating a real-time picture displaying the two-dimensional code based on the two-dimensional code information and the generated camera real-time capturing picture.

In some embodiments, the generating a real-time picture displaying a two-dimensional code based on the two-dimensional code information and the generated camera real-time capturing picture includes: performing blurring processing on the camera real-time capturing picture; and converting the two-dimensional code information into a two-dimensional code, and displaying the generated two-dimensional code on the blurred camera real-time capturing picture.

In some embodiments, the generating a real-time picture displaying a two-dimensional code based on the two-dimensional code information and the generated camera real-time capturing picture includes: converting the two-dimensional code information into a two-dimensional code, and displaying the generated two-dimensional code on the generated camera real-time capturing picture.

In some embodiments, after generating a real-time picture displaying the two-dimensional code based on the two-dimensional code information and the generated camera real-time capturing picture, the method further includes: setting a distance value between adjacent color blocks in the two-dimensional code as a first preset threshold.

In some embodiments, the generating a real-time picture displaying a two-dimensional code based on the two-dimensional code information and the generated camera real-time capturing picture includes: setting a target error tolerance rate of the two-dimensional code, wherein the target error tolerance rate is greater than a second preset threshold; and converting the two-dimensional code information into the two-dimensional code based on the target error tolerance rate, and displaying the generated two-dimensional code on the generated camera real-time capturing picture.

In some embodiments, the method further includes: turning off the camera in response to receiving a two-dimensional code turn-off command input by the user.

According to a second aspect, an embodiment of the present disclosure provides a two-dimensional code generation apparatus applied to a terminal device, the terminal device including a camera, the apparatus including: a receiving unit configured to receive a two-dimensional code generation instruction input by a user, wherein the two-dimensional code generation instruction comprises two-dimensional code information; a captured picture generating unit configured to start the camera to generate a camera real-time capturing picture; and a two-dimensional code picture generating unit configured to generate a real-time picture displaying the two-dimensional code based on the two-dimensional code information and the generated camera real-time capturing picture.

In some embodiments, he two-dimensional code picture generating unit is further configured to: perform blurring processing on the camera real-time capturing picture; and convert the two-dimensional code information into the two-dimensional code, and display the generated two-dimensional code on the blurred camera real-time capturing picture.

In some embodiments, the two-dimensional code picture generating unit is further configured to: convert the two-dimensional code information into the two-dimensional code, and display the generated two-dimensional code on the generated camera real-time capturing picture.

In some embodiments, the apparatus further includes a setting unit configured to set a distance value between adjacent color blocks in the two-dimensional code as a first preset threshold.

In some embodiments, the two-dimensional code picture generation unit is further configured to set a target error tolerance rate of the two-dimensional code, wherein the target error tolerance rate is greater than a second preset threshold; and convert the two-dimensional code information into the two-dimensional code based on the target error tolerance rate, and display the generated two-dimensional code on the generated camera real-time capturing picture.

In some embodiments, the apparatus further includes a camera turn-off unit configured to turn off the camera in response to receiving a two-dimensional code turn-off command input by a user.

According to the two-dimensional code generation method and apparatus applied to a terminal device provided in the embodiment of the present disclosure, a two-dimensional code generation instruction input by a user may be received, and then a camera may be started to generate a camera real-time capturing picture, and finally a real-time picture displaying the two-dimensional code may be generated based on the two-dimensional code information and the generated camera real-time capturing picture.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION

Figure 1:
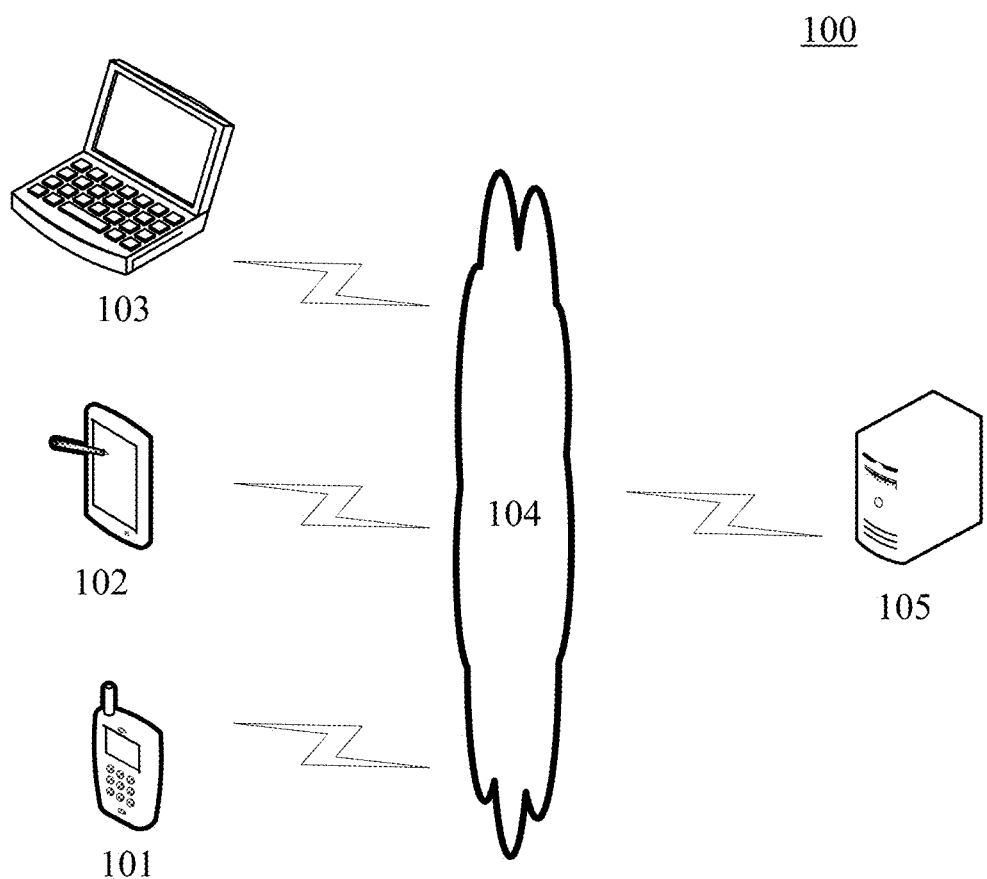
FIG. 1 is an example system architecture diagram in which an embodiment of the present disclosure may be applied.

The present disclosure is described in further detail below with reference to the accompanying drawings and examples. It is to be understood that the specific embodiments described herein are merely illustrative of the related disclosure and are not restrictive of the disclosure. It is also to be noted that, for ease of description, only parts related to the disclosure are shown in the drawings.

It should be noted that the embodiments in the present disclosure and the features in the embodiments may be combined with each other without conflict. The present disclosure will now be described in detail with reference to the accompanying drawings and examples.

FIG. 1 illustrates an example system architecture 100 in which an embodiment of a two-dimensional code generation method applied to a terminal device or a two-dimensional code generation apparatus applied to a terminal device of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The user may interact with the server 105 through the network 104 using the terminal devices 101, 102, 103 to receive or send messages, etc. The terminal devices 101, 102 and 103 are provided with a camera which can be used for image acquisition. Various client applications, such as social platform software, payment applications, web browser applications, shopping applications, search applications, instant messaging tools, mailbox clients, and the like, may be installed on the terminal devices 101, 102, 103.

The terminal devices 101, 102, 103 may be various electronic devices having a display screen and supporting image acquisition and two-dimensional code display, including but not limited to a smartphone, a tablet computer, an electronic book reader, a laptop computer, a desktop computer, and the like.

It will be appreciated that the terminal devices 101, 102, and 103 may support not only image acquisition and two-dimensional code display, but also the terminal devices 101, 102, and 103 may perform analysis processing on the obtained camera real-time capturing pictures, two-dimensional code information, and the like to obtain two-dimensional codes. In this case, the two-dimensional code generation method applied to the terminal device provided in the embodiment of the present disclosure may be executed by the terminal devices 101, 102, and 103. Accordingly, the two-dimensional code generating apparatus applied to the terminal may be arranged in the terminal devices 101, 102, 103. In this case, the server 105 and the network 104 may not need to be disposed in the system architecture 100.

It should be further understood that the two-dimensional codes displayed on the terminal devices 101, 102, and 103 may be two-dimensional codes obtained by the server 105 by analyzing the received two-dimensional code generation instruction and the data such as the real-time picture captured by the camera. The terminal devices 101, 102, and 103 may acquire the two-dimensional code information from the server 105 through the network 104 and generate the displayed two-dimensional codes. In this case, the two-dimensional code generation method applied to the terminal device provided in the embodiment of the present disclosure may be executed by the server 105, and accordingly, the two-dimensional code generation apparatus applied to the terminal device is generally arranged in the server 105.

It should be noted that the server may be hardware or software. When the server is hardware, the server may be implemented a distributed server cluster composed of multiple servers, or a single server may be implemented. When the server is software, it may be implemented as a plurality of software pieces or software modules (e.g., for providing distributed services), or it may be implemented as a single software piece or software module, which is not specifically limited herein.

It should be understood that the number of terminal devices, networks and servers in FIG. 1 is merely illustrative. There may be any number of terminal devices, networks, and servers as desired for implementation.

Figure 2:
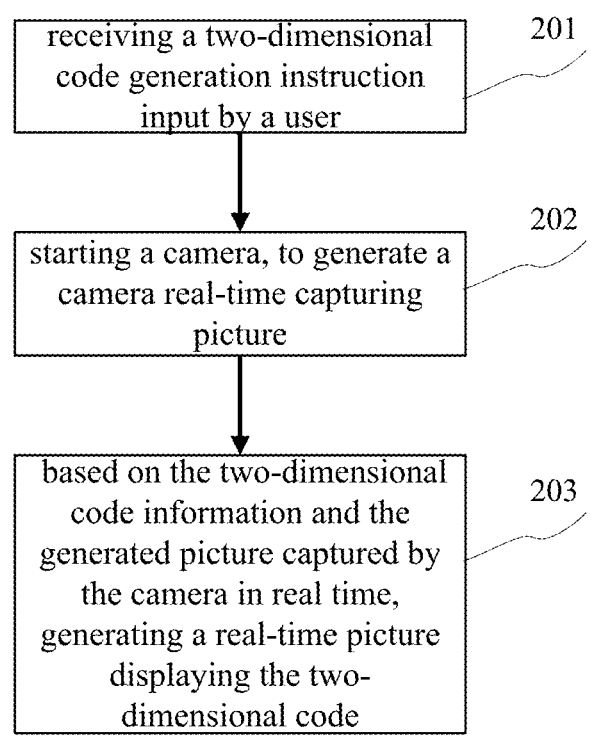
FIG. 2 is a flowchart of an embodiment of a two-dimensional code generation method applied to a terminal device according to the present disclosure.

With continuing reference to FIG. 2, a flow 200 of an embodiment of a two-dimensional code generation method applied to a terminal device according to the present disclosure is shown. The two-dimensional code generation method applied to a terminal device includes the following steps.

Step 201 includes receiving a two-dimensional code generation instruction input by a user.

In the present embodiment, in the case where the user performs payment, authentication, or the like using the terminal device, the user may input the two-dimensional code generation instruction to the terminal device by clicking, touch, or the like. An execution body of the two-dimensional code generation method applied to a terminal device (for example, the terminal devices 101, 102, 103 shown in FIG. 1) may receive the two-dimensional code generation instruction input by the user. The two-dimensional code generation instruction may include two-dimensional code information for generating the two-dimensional code. Generally, the two-dimensional code information may include data information such as characters, numbers, letters, images, and sounds.

Step 202 includes: starting a camera, to generate a camera real-time capturing picture.

In this embodiment, the terminal device may be provided with a camera. For example, a front-facing camera or a rear-facing camera of a mobile terminal. In response to receiving the two-dimensional code generation instruction in step 201, the above-described execution body (e.g., the terminal devices 101, 102, 103 shown in FIG. 1) may start the camera mounted on the terminal device. After the camera is started, the surrounding environment can be photographed in real time, thereby generating a camera real-time capturing picture. It will be appreciated that the generated camera real-time capturing picture may be displayed on the terminal device. As an example, the terminal device may be a mobile phone, and after the camera on the mobile phone is started, a picture captured by the camera may be displayed on a display screen of the mobile phone in real time. It will be appreciated that the picture capture by the camera in real time may not be stored.

Step 203 includes: based on the two-dimensional code information and the generated picture captured by the camera in real time, generating a real-time picture displaying the two-dimensional code.

In the present embodiment, after receiving the two-dimensional code information in the two-dimensional code generation instruction and the camera real-time capturing picture acquired by the camera, the above-mentioned execution body can generate a real-time picture displaying the two-dimensional code based on the two-dimensional code information and the camera real-time capturing picture. As an example, the above-described execution body may perform a series of conversions of the two-dimensional code information, and convert the two-dimensional code information into a two-dimensional code pattern storing the two-dimensional code information and being located at the camera real-time capturing picture. It will be appreciated that the surrounding environment may be photographed in real time after the camera is started, so that the interface of the terminal device can display the current-frame picture captured by the camera, that is, the current-frame picture is the camera real-time capturing picture. The two-dimensional code obtained by converting the two-dimensional code information is displayed in a current-frame picture captured by the camera, thereby generating a real-time picture displaying the two-dimensional code.

In some alternative implementations of the present embodiment, the above-described execution body may convert the two-dimensional code information into a two-dimensional code pattern directly on the camera real-time capturing picture, thereby generating a real-time picture displaying the two-dimensional code. Alternatively, the above-described execution body may perform image processing on the camera real-time capturing picture generated by the camera acquisition, and then convert the two-dimensional code information into a two-dimensional code pattern in the processed camera real-time capturing picture.

Compared with a static two-dimensional code without a background image and a static two-dimensional code with a background image in the existing technology, for a two-dimensional code generated by using the method provided in the embodiments of the present disclosure, a background image of the two-dimensional code is a real-time picture obtained by photographing a surrounding environment by using a camera of the terminal device of the user, so that a code sweeping side (a side that scans the generated two-dimensional code) can determine whether the two-dimensional code displayed on the terminal device is an originally generated two-dimensional code from the background image of the generated two-dimensional code, thereby avoiding information leakage caused by screenshot or photographing of the two-dimensional code, and improving security of the two-dimensional code.

In some alternative implementations of the present embodiment, the above-described execution body may scan the generated two-dimensional code after a real-time picture displaying the two-dimensional code is generated. Receiving a two-dimensional code turn-off instruction input by a user after the code scanning side completes scanning of the generated two-dimensional code, so that the execution body may turn off the camera.

In some alternative implementations of the present embodiment, after the scanning of the generated two-dimensional code by the code sweeping side is completed, the above-mentioned execution body may directly generate a turn-off instruction of the two-dimensional code, and turn off the camera that has been started.

In some alternative implementations of the present embodiment, in the two-dimensional code real-time picture generated and displayed by the above-mentioned execution body, the size of the two-dimensional code pattern may be the same as the size of the camera real-time capturing picture. Alternatively, the size of the two-dimensional code pattern may be smaller than the size of the camera real-time capturing picture, and the two-dimensional code image may be located at a middle position or at any corner position of the camera real-time capturing picture.

Generally, converting the two-dimensional code information into a two-dimensional code pattern may include a plurality of steps. First, the original data in the two-dimensional code information is encoded into a series of character strings according to a certain pattern, for example, the original data is formed into a binary character string composed of 0 and 1 according to binary encoding, and then the binary character string is further converted into a color block column according to the principle that 1 represents a dark color block and 0 represents a light color block, and finally the color block sequence is filled into a square matrix according to a specific rule, thereby forming the two-dimensional code. Generally, there is no gap between the color blocks in the generated two-dimensional code. Therefore, after the conventional two-dimensional code is generated, the user cannot see the background image of the two-dimensional code through the two-dimensional code. According to the method provided in above embodiments of the present disclosure, a first preset threshold may be preset, and the execution body may control a distance between adjacent color blocks of the generated two-dimensional code to be the first preset threshold. Therefore, by setting the first preset threshold, a certain gap can be formed between adjacent color blocks in the generated two-dimensional code, and the background of the two-dimensional code can be more conveniently seen by the user through the gap, so that whether the two-dimensional code displayed by the user is a screenshot or the like can be more easily identified, thereby further improving the security of the two-dimensional code.

Figure 3:
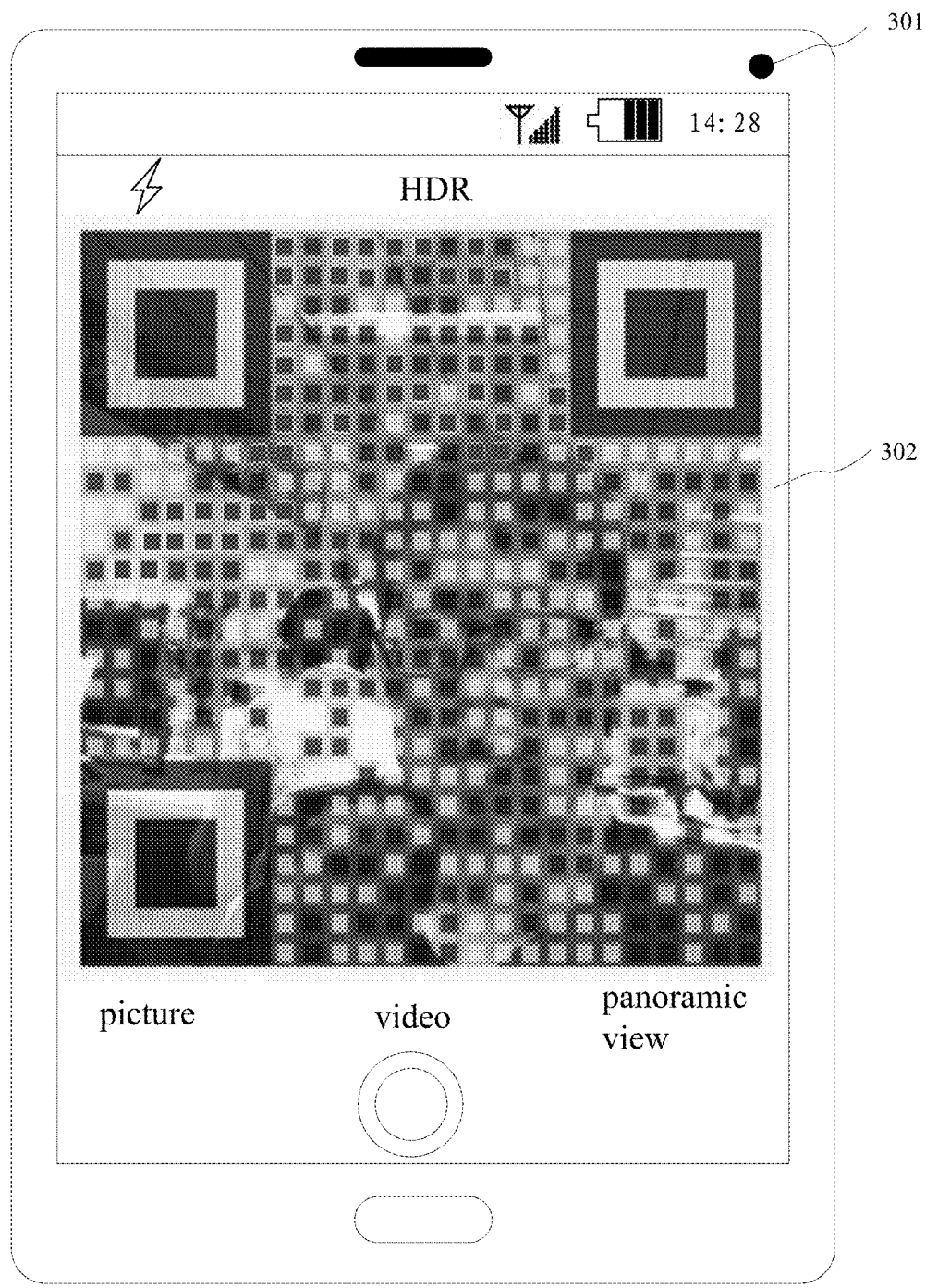
FIG. 3 is a schematic diagram of an application scenario of a two-dimensional code generation method applied to a terminal device according to the present disclosure.

Continuing to refer to FIG. 3, FIG. 3 is a schematic diagram of an application scenario of a two-dimensional code generation method applied to a terminal device according to the present embodiment. In the application scenario of FIG. 3, a mobile phone may receive a two-dimensional code generation instruction input by the user, and the two-dimensional code generation instruction may include two-dimensional code information. Then, the front-facing camera 301 (or the rear-facing camera) of the mobile phone is started so that the front-facing camera of the mobile phone can photographing the surrounding environment in real time, thereby generating a camera real-time capturing picture, as shown in FIG. 3. It will be appreciated that the camera may be started using the "camera" application software in the mobile phone. Finally, based on the two-dimensional code information and the real-time picture captured by the camera, a real-time picture 302 superimposing two-dimensional codes can be generated and displayed on the mobile phone, as shown in FIG. 3. The real-time picture superimposing the two-dimensional code may include a two-dimensional code pattern converted from the two-dimensional code information and a picture captured by the camera in real time and used as a dynamic background image, and the real-time picture superimposing two-dimensional code may be displayed on an interface opened by the "camera" application software.

According to the two-dimensional code generation method and apparatus applied to a terminal device provided in the embodiment of the present disclosure, a two-dimensional code generation instruction input by a user may be received, and then a camera may be started to generate a picture captured by the camera in real time, and finally a real-time picture displaying the two-dimensional code can be generated based on the two-dimensional code information and the generated camera real-time capturing picture.

Figure 4:
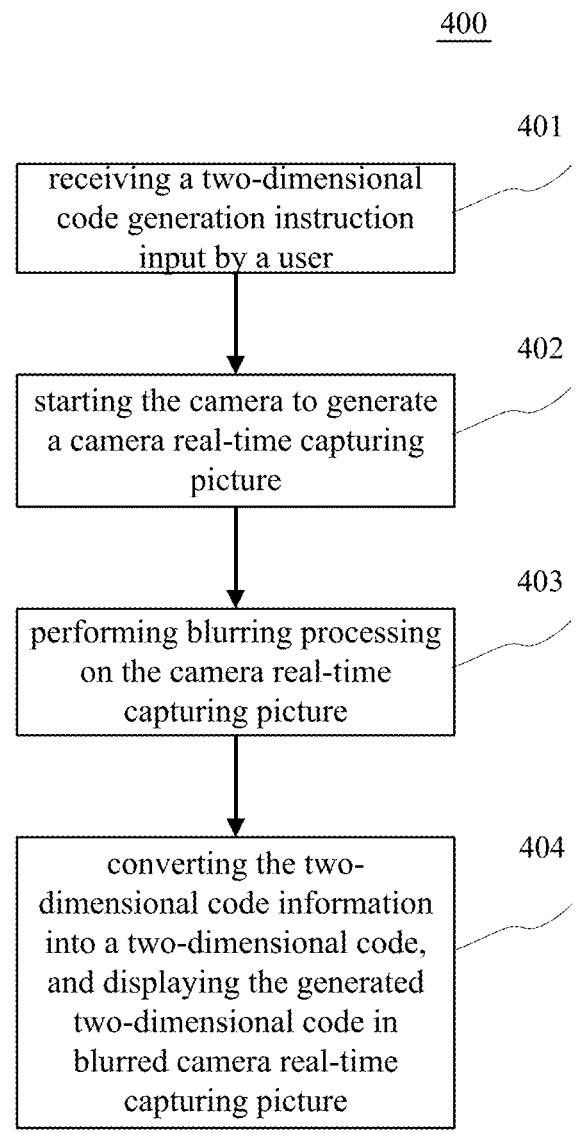
FIG. 4 is a flowchart of yet another embodiment of a two-dimensional code generation method applied to a terminal device according to the present disclosure.

Referring further to FIG. 4, there is shown a flow 400 of another embodiment of a two-dimensional code generation method applied to a terminal device. The flow 400 of the two-dimensional code generation method applied to a terminal device includes the following steps.

Step 401 includes: receiving a two-dimensional code generation instruction input by a user.

In the present embodiment, when the user performs payment or authentication using the terminal device or the like, the user may input a two-dimensional code generation instruction to the terminal device through an operation such as clicking or touching. An execution body of a two-dimensional code generation method applied to a terminal device (for example, the terminal devices 101, 102, 103 shown in FIG. 1) may receive a two-dimensional code generation instruction input by a user. The two-dimensional code generation instruction may include two-dimensional code information for generating the two-dimensional code. Generally, the two-dimensional code information may include data information such as characters, numbers, letters, images, and sounds.

Step 402 includes: starting the camera to generate a camera real-time capturing picture.

In the embodiment, the terminal device may be provided with a camera. For example, a front-facing camera or a rear-facing camera of a mobile terminal. Based on the two-dimensional code generation instruction received in step 201, the above-mentioned execution body (for example, the terminal devices 101, 102, 103 shown in FIG. 1) may start the camera mounted on the terminal device. After the camera is started, the surrounding environment can be photographed in real time, so that the generated camera real-time capturing picture can be obtained. It will be appreciated that the generated camera real-time capturing picture may be displayed on the terminal device. As an example, the terminal device may be a mobile phone, and after the camera on the mobile phone is started, a picture captured by the camera may be displayed on a display screen of the mobile phone in real time. It will be appreciated that the camera real-time capturing picture may not be stored, for example, the camera real-time capturing picture may be a picture displayed on the interface by opening a "camera" application in the mobile phone without capturing and storing the picture displayed on the interface.

Step 403 includes: performing blurring processing on the camera real-time capturing picture.

In the present embodiment, based on the camera real-time capturing picture generated in step 402, the above-described execution body may perform blurring processing on the generated camera real-time capturing picture using various methods such as a direct convolution method, an FFT (fast Fourier transform) method based on a convolution theorem, and an integral graph method.

As an example, the blurred picture may be obtained by performing a convolutional operation after zooming out camera real-time capturing picture. Specifically, an appropriate zooming factor may first be selected to zoom out the generated camera real-time capturing picture; then a convolution operation may be performed on a filtered template and the zoom-out camera real-time capturing picture so that the zoom-out camera real-time capturing picture is blurred; finally, the blurred zoom-out picture may be enlarged by a linear interpolation operation, so that a blurred camera real-time capturing picture with the same size as the original picture can be obtained.

Step 404 includes: converting the two-dimensional code information into a two-dimensional code, and displaying the generated two-dimensional code in blurred camera real-time capturing picture.

In the present embodiment, the above-described execution body may convert the two-dimensional code information into a two-dimensional code pattern and display the converted two-dimensional code in the blurred camera real-time capturing picture, based on the blurred camera real-time capturing picture obtained in step 403. The two-dimensional code pattern is generated on the camera real-time capturing picture after the camera real-time capturing picture is blurred, so that the success rate of code scanning of the generated two-dimensional code can be improved.

For example, the generated two-dimensional code picture may be composed of a black block and a white block, and in the camera real-time capturing picture, there may be a black block or a white block that is the same or similar in shape to the black block and the white block in the two-dimensional code. The presence of such a color block may cause the two-dimensional code generated in the unprocessed camera real-time capturing picture to fail to be scanned. However, after the blurring process is performed on the camera real-time capturing picture, the probability of determination that the black block or the white block having the same shape or similar shape as the black block and the white block in the two-dimensional code is a part of the generated two-dimensional code can be reduced, thereby increasing the probability of successful code scanning of the generated two-dimensional code.

In some alternative implementations of the present embodiment, generating a real-time picture displaying the two-dimensional code based on the two-dimensional code information may further include: setting a target error tolerance rate of the two-dimensional code, where the target error tolerance rate is greater than a second preset threshold; converting the two-dimensional code information into the two-dimensional code at the target error tolerance rate, and displaying the generated two-dimensional code in the generated camera real-time capturing picture. Specifically, after the execution subject starts the camera to generate a camera real-time capturing picture, the execution subject may set a target error tolerance rate for a two-dimensional code to be generated, and may ensure that the target error tolerance rate can be a large value by defining that the target error tolerance rate is greater than the second preset threshold; then, the execution body may convert the two-dimensional code information into the two-dimensional code based on the target error tolerance rate, and display the generated two-dimensional code on the generated camera real-time capturing picture. The method can also improve the success rate of scanning the generated two-dimensional code. The error tolerance rate of the two-dimensional code, also referred to as the error correction rate of the two-dimensional code, can generally represent the ability of scanning the blocked two-dimensional code. In general, the higher the fault tolerance rate is, the more portions of the two-dimensional code pattern can be blocked.

In some alternative implementations of the present embodiment, generating a real-time picture displaying the two-dimensional code based on the two-dimensional code information may further include setting a target error tolerance rate of the two-dimensional code, where the target error tolerance rate is greater than a second preset threshold; converting the two-dimensional code information into the two-dimensional code based on the target error tolerance rate, and displaying the generated two-dimensional code on a blurred camera real-time capturing picture.

As can be seen from FIG. 4, compared with the embodiment corresponding to FIG. 2, the flow 400 of the two-dimensional code generation method applied to the terminal device in the present embodiment highlights the step of generating a real-time picture displaying the two-dimensional code based on the two-dimensional code information and the generated camera real-time capturing picture. As a result, the solution described in the present embodiment can improve the security of the two-dimensional code while improving the probability of successful scanning of the two-dimensional code.

Figure 5:
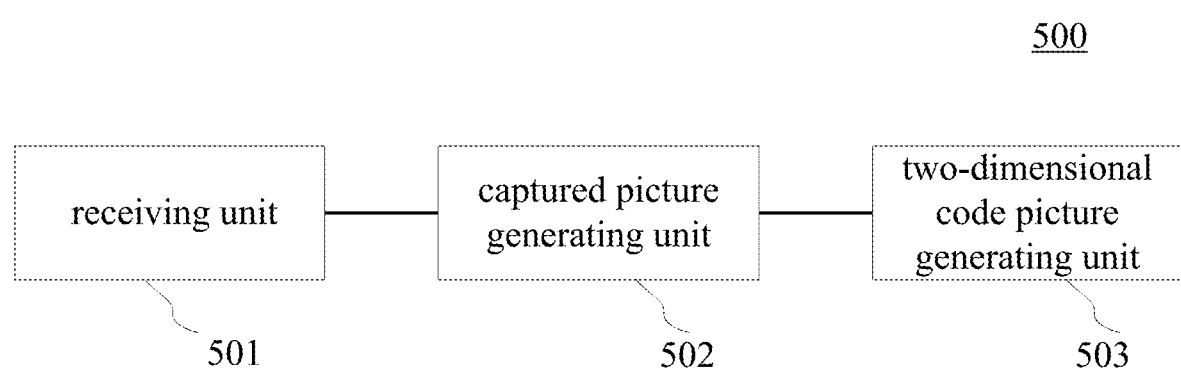
FIG. 5 is a schematic structural diagram of an embodiment of a two-dimensional code generating apparatus applied to a terminal device according to the present disclosure.

With further reference to FIG. 5, as an implementation of the method shown in above figures, the present disclosure provides an embodiment of a two-dimensional code generating apparatus applied to a terminal device, which corresponds to the method embodiment shown in FIG. 2, and which is particularly applicable to various electronic devices.

As shown in FIG. 5, the two-dimensional code generation apparatus 500 applied to a terminal device according to the present embodiment includes a receiving unit 501, a captured picture generation unit 502, and a two-dimensional code picture generation unit 503. The terminal device may include a camera. The receiving unit 501 is configured to receive a two-dimensional code generation instruction input by a user, where the two-dimensional code generation instruction includes two-dimensional code information; The captured picture generating unit 502 is configured to start a camera to generate a camera real-time capturing picture; the two-dimensional code picture generating unit 503 is configured to generate a real-time picture displaying the two-dimensional code based on the two-dimensional code information and the generated camera real-time capturing picture.

According to the two-dimensional code generation apparatus 500 applied to a terminal device provided in the embodiments of the present disclosure, the receiving unit 501 may receive a two-dimensional code generation instruction input by a user, and then the captured picture generation unit 502 may start a camera to generate a camera real-time capturing picture, and finally, the two-dimensional code picture generation unit 503 may generate a real-time picture displaying a two-dimensional code based on the two-dimensional code information and the generated camera real-time capturing picture, so that the user can distinguish whether the generated two-dimensional code is a screenshot of two-dimensional code, thereby improving the security of the two-dimensional code information.

In some alternative implementations of the present embodiment, the two-dimensional code picture generation unit 503 is further configured to perform blurring processing on the camera real-time capturing picture; convert the two-dimensional code information into a two-dimensional code, and display the generated two-dimensional code on the blurred camera real-time capturing picture.

In some alternative implementations of the present embodiment, the two-dimensional code picture generation unit 503 is further configured to convert the two-dimensional code information into a two-dimensional code, and display the generated two-dimensional code on the generated camera real-time capturing picture.

In some alternative implementations of the present embodiment, the apparatus 500 further includes a setting unit configured to set a distance value between adjacent color blocks in the two-dimensional code to a first preset threshold.

In some alternative implementations of the present embodiment, the two-dimensional code picture generation unit 503 is further configured to set a target error tolerance rate of the two-dimensional code, where the target error tolerance rate is greater than a second preset threshold; convert the two-dimensional code information into the two-dimensional code based on the target error tolerance rate, and display the generated two-dimensional code on the generated camera real-time capturing picture.

In some alternative implementations of the present embodiment, the apparatus 500 further includes a camera turn-off unit configured to turn off the camera in response to receiving a two-dimensional code turn-off command input by the user.

Figure 6:
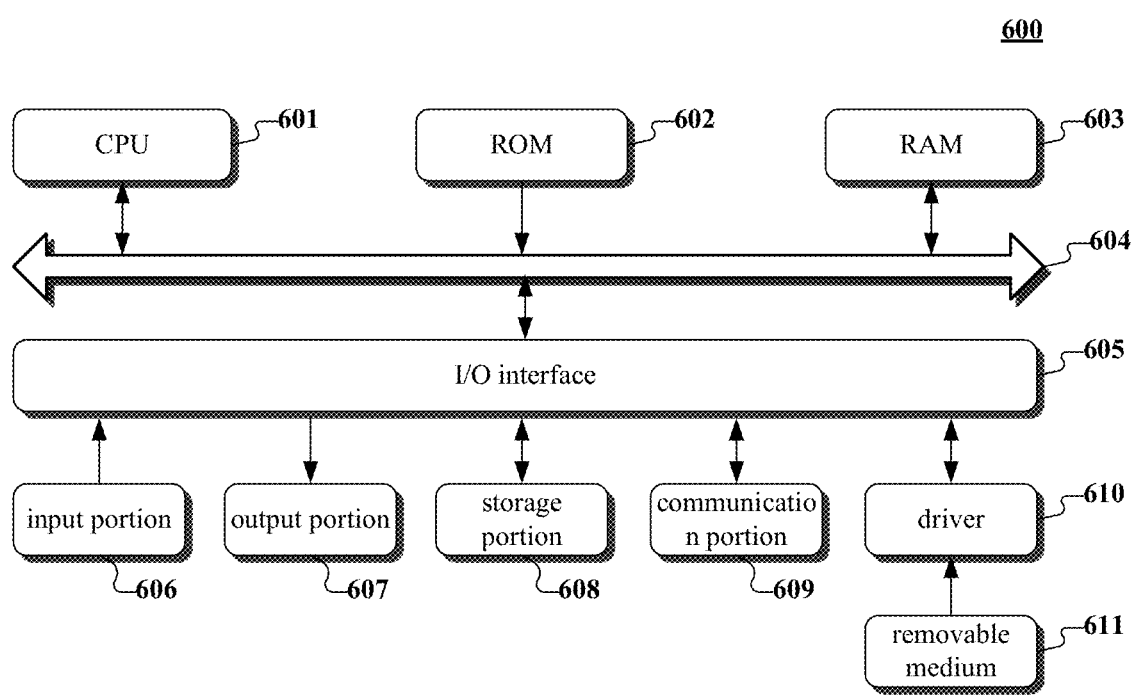
FIG. 6 is a schematic structural diagram of a computer system adapted for implementing an electronic device according to an embodiment of the present disclosure.

Referring now to FIG. 6, there is shown a schematic structural diagram of a computer system 600 adapted for implementing an electronic device (e.g., terminal devices 101, 102, 103 in FIG. 1) of an embodiment of the present disclosure. The electronic device shown in FIG. 6 is merely an example and should not be construed as limiting the functionality and scope of embodiments of the present disclosure.

As shown in FIG. 6, the computer system 600 includes a central processing unit (CPU) 601, which may perform various appropriate actions and processes according to a program stored in a read-only memory (ROM) 602 or a program loaded into a random access memory (RAM) 603 from a storage portion 608. The RAM 603, also stores various programs and data required by operations of the system 600. The CPU 601, ROM 602, and RAM 603 are connected to each other via bus 604. An input/output (I/O) interface 605 is also connected to bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a receiving unit, a captured picture generating unit, and a two-dimensional code picture generating unit. Here, the names of these units do not in some cases constitute a limitation to such units themselves. For example, the receiving unit may also be described as a unit for receiving a two-dimensional code generation instruction input by a user.

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: receive a two-dimensional code generation instruction input by a user, where the two-dimensional code generation instruction includes two-dimensional code information; start a camera and generate a camera to capture a picture in real time; and generate a real-time picture displaying the two-dimensional code based on the two-dimensional code information and the generated camera real-time capturing picture.

The above description is only a preferred embodiment of the disclosure and a description of the technical principles employed. It should be understood by those skilled in the art that the scope of the disclosure referred to in this disclosure is not limited to the technical solutions formed by specific combinations of the above-mentioned technical features, but also covers other technical solutions formed by any combination of the above-mentioned technical features or equivalents thereof without departing from the inventive concept. For example, the above-mentioned features and the technical features having similar functions disclosed in the present disclosure are replaced with each other.

What is claimed is:

1. A two-dimensional code generation method applied to a terminal device, the terminal device comprising a camera, the method comprising:
   receiving a two-dimensional code generation instruction input by a user, wherein the two-dimensional code generation instruction comprises two-dimensional code information;
   starting the camera to generate a camera real-time capturing picture; and
   generating a real-time picture displaying the two-dimensional code based on the two-dimensional code information and the generated camera real-time capturing picture, wherein the generating a real-time picture displaying a two-dimensional code based on the two-dimensional code information and the generated camera real-time capturing picture comprises:
   setting a target error tolerance rate of the two-dimensional code, wherein the target error tolerance rate is greater than a second preset threshold; and
   converting the two-dimensional code information into the two-dimensional code based on the target error tolerance rate, and displaying the generated two-dimensional code on the generated camera real-time capturing picture.

2. The method according to claim 1, wherein the generating a real-time picture displaying a two-dimensional code based on the two-dimensional code information and the generated camera real-time capturing picture further comprises:
   performing blurring processing on the camera real-time capturing picture.

3. The method according to claim 1, wherein after generating a real-time picture displaying the two-dimensional code based on the two-dimensional code information and the generated camera real-time capturing picture, the method further comprises:
   setting a distance value between adjacent color blocks in the two-dimensional code as a first preset threshold.

4. The method according to claim 1, wherein the method further comprises:
   turning off the camera in response to receiving a two-dimensional code turn-off command input by the user.

5. A two-dimensional code generating apparatus applied to a terminal device, the terminal device comprising a camera, the apparatus comprising:
   a processor and a memory storing computer readable instructions, wherein the instructions, when executed by the processor, cause the processor to perform operations, the operations comprising:
   receiving a two-dimensional code generation instruction input by a user, wherein the two-dimensional code generation instruction comprises two-dimensional code information;
   starting the camera to generate a camera real-time capturing picture;
   generating a real-time picture displaying the two-dimensional code based on the two-dimensional code information and the generated camera real-time capturing picture, wherein the generating a real-time picture displaying a two-dimensional code based on the two-dimensional code information and the generated camera real-time capturing picture comprises:
   setting a target error tolerance rate of the two-dimensional code, wherein the target error tolerance rate is greater than a second preset threshold; and
   converting the two-dimensional code information into the two-dimensional code based on the target error tolerance rate, and displaying the generated two-dimensional code on the generated camera real-time capturing picture.

6. The apparatus according to claim 5, wherein the generating a real-time picture displaying a two-dimensional code based on the two-dimensional code information and the generated camera real-time capturing picture further comprises:
   performing blurring processing on the camera real-time capturing picture.

7. The apparatus according to claim 5, wherein after generating a real-time picture displaying the two-dimensional code based on the two-dimensional code information and the generated camera real-time capturing picture, the operations further comprise:
   setting a distance value between adjacent color blocks in the two-dimensional code as a first preset threshold.

8. The apparatus according to claim 5, wherein the operations further comprise:
   turning off the camera in response to receiving a two-dimensional code turn-off command input by a user.

9. A non-transitory computer readable medium storing a computer program, wherein the program, when executed by a processor, causes the processor to perform operations, the operations comprising:
   receiving a two-dimensional code generation instruction input by a user, wherein the two-dimensional code generation instruction comprises two-dimensional code information;
   starting the camera to generate a camera real-time capturing picture; and
   generating a real-time picture displaying the two-dimensional code based on the two-dimensional code information and the generated camera real-time capturing picture, wherein the generating a real-time picture displaying a two-dimensional code based on the two-dimensional code information and the generated camera real-time capturing picture comprises:
   setting a target error tolerance rate of the two-dimensional code, wherein the target error tolerance rate is greater than a second preset threshold; and
   converting the two-dimensional code information into the two-dimensional code based on the target error tolerance rate, and displaying the generated two-dimensional code on the generated camera real-time capturing picture.

10. The computer readable medium according to claim 9, wherein the generating a real-time picture displaying a two-dimensional code based on the two-dimensional code information and the generated camera real-time capturing picture further comprises:
    performing blurring processing on the camera real-time capturing picture.

11. The computer readable medium according to claim 9, wherein after generating a real-time picture displaying the two-dimensional code based on the two-dimensional code information and the generated camera real-time capturing picture, the operations further comprise:

setting a distance value between adjacent color blocks in the two-dimensional code as a first preset threshold.

12. The computer readable medium according to claim 9, wherein the operations further comprise:

turning off the camera in response to receiving a two-dimensional code turn-off command input by a user.

\* \* \* \* \*